US008427494B2

(12) United States Patent
Prabhakar et al.

(10) Patent No.: US 8,427,494 B2
(45) Date of Patent: Apr. 23, 2013

(54) VARIABLE-LENGTH CODING DATA TRANSFER INTERFACE

(75) Inventors: Ram Prabhakar, Palo Alto, CA (US); Neal Meininger, San Jose, CA (US); Lefan Zhong, Santa Clara, CA (US); Cahide Kiris, Palo Alto, CA (US); Ed Ahn, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 433 days.

(21) Appl. No.: 10/769,520

(22) Filed: Jan. 30, 2004

(65) Prior Publication Data

US 2005/0168470 A1   Aug. 4, 2005

(51) Int. Cl.
*G09G 5/39* (2006.01)

(52) U.S. Cl.
USPC ........... 345/531; 345/537; 345/543; 345/544; 341/67

(58) Field of Classification Search .................. 345/531, 345/537, 543, 544; 375/240.01–240.03, 375/240.23, 253; 370/395.64; 382/246; 341/67
See application file for complete search history.

(56) References Cited

U.S. PATENT DOCUMENTS

| | | | |
|---|---|---|---|
| 5,163,136 A * | 11/1992 | Richmond | 710/30 |
| 5,189,671 A * | 2/1993 | Cheng | 370/471 |
| 5,774,206 A * | 6/1998 | Wasserman et al. | 709/247 |
| 5,796,743 A * | 8/1998 | Bunting et al. | 370/474 |
| 5,821,886 A * | 10/1998 | Son | 375/240.01 |
| 6,008,745 A | 12/1999 | Zandi et al. | |
| 6,023,088 A * | 2/2000 | Son | 257/347 |
| 6,041,403 A | 3/2000 | Parker et al. | |
| 6,144,322 A * | 11/2000 | Sato | 375/240.23 |
| 6,246,347 B1 | 6/2001 | Bakhmutsky | |
| 6,298,370 B1 * | 10/2001 | Tang et al. | 718/102 |
| 6,317,063 B1 | 11/2001 | Matsubara | |
| 6,339,658 B1 * | 1/2002 | Moccagatta et al. | 382/240 |
| 6,441,757 B1 | 8/2002 | Hirano | |
| 6,462,744 B1 * | 10/2002 | Mochida et al. | 345/543 |
| 6,480,489 B1 * | 11/2002 | Muller et al. | 370/389 |
| 6,543,023 B2 | 4/2003 | Bessios | |
| 6,552,673 B2 * | 4/2003 | Webb | 341/67 |
| 6,563,440 B1 | 5/2003 | Kangas | |
| 6,563,441 B1 | 5/2003 | Gold | |
| 6,577,681 B1 | 6/2003 | Kimura | |
| 6,587,057 B2 | 7/2003 | Scheuermann | |
| 6,654,539 B1 | 11/2003 | Duruoz et al. | |
| 6,696,992 B1 | 2/2004 | Chu | |

(Continued)

FOREIGN PATENT DOCUMENTS

| | | |
|---|---|---|
| CN | 101017574 | 8/2007 |
| JP | 06276394 A | 9/1994 |

(Continued)

OTHER PUBLICATIONS

English Translation of Office Action for Chinese Patent Application No. 200810212373.X, Entitled: Decoding Variable Length Codes in JPEG Applications.

(Continued)

*Primary Examiner* — M Good Johnson

(57) ABSTRACT

A VLC data transfer interface is presented that allows digital data to be packed and assembled according to a format selectable from a number of formats while the data is being transferred to a desired destination.

21 Claims, 11 Drawing Sheets

U.S. PATENT DOCUMENTS

| | | | |
|---|---|---|---|
| 6,795,503 B2 * | 9/2004 | Nakao et al. | 375/240.16 |
| 6,839,624 B1 | 1/2005 | Beesley et al. | |
| 6,891,976 B2 * | 5/2005 | Zheltov et al. | 382/246 |
| 6,981,073 B2 * | 12/2005 | Wang et al. | 710/28 |
| 7,016,547 B1 | 3/2006 | Smirnov | |
| 7,051,123 B1 * | 5/2006 | Baker et al. | 710/22 |
| 7,068,407 B2 * | 6/2006 | Sakai et al. | 359/204.1 |
| 7,068,919 B2 * | 6/2006 | Ando et al. | 386/95 |
| 7,069,407 B1 * | 6/2006 | Vasudevan et al. | 711/169 |
| 7,074,153 B2 * | 7/2006 | Usoro et al. | 475/275 |
| 7,113,115 B2 | 9/2006 | Partiwala et al. | |
| 7,113,546 B1 * | 9/2006 | Kovacevic et al. | 375/240.26 |
| 7,119,813 B1 * | 10/2006 | Hollis et al. | 345/605 |
| 7,129,862 B1 | 10/2006 | Shirdhonkar et al. | |
| 7,132,963 B2 | 11/2006 | Pearlstein et al. | |
| 7,158,539 B2 * | 1/2007 | Zhang et al. | 370/473 |
| 7,209,636 B2 * | 4/2007 | Imahashi et al. | 386/52 |
| 7,230,986 B2 * | 6/2007 | Wise et al. | 375/240.26 |
| 7,248,740 B2 * | 7/2007 | Sullivan | 382/232 |
| 7,286,543 B2 * | 10/2007 | Bass et al. | 370/395.7 |
| 7,289,047 B2 | 10/2007 | Nagori | |
| 7,372,378 B2 | 5/2008 | Sriram | |
| 7,372,379 B1 | 5/2008 | Jia et al. | |
| 7,432,835 B2 | 10/2008 | Ohashi et al. | |
| 7,606,313 B2 * | 10/2009 | Raman et al. | 375/240.27 |
| 7,627,042 B2 * | 12/2009 | Raman et al. | 375/240.27 |
| 7,724,827 B2 | 5/2010 | Liang et al. | |
| 2001/0010755 A1 * | 8/2001 | Ando et al. | 386/69 |
| 2001/0026585 A1 * | 10/2001 | Kumaki | 375/240.01 |
| 2002/0094031 A1 | 7/2002 | Ngai et al. | |
| 2003/0043919 A1 * | 3/2003 | Haddad | 375/240.25 |
| 2003/0156652 A1 | 8/2003 | Wise et al. | |
| 2003/0179706 A1 | 9/2003 | Goetzinger et al. | |
| 2003/0196040 A1 * | 10/2003 | Hosogi et al. | 711/128 |
| 2004/0028142 A1 | 2/2004 | Kim | |
| 2004/0056787 A1 * | 3/2004 | Bossen | 341/106 |
| 2004/0059770 A1 * | 3/2004 | Bossen | 708/530 |
| 2004/0067043 A1 | 4/2004 | Duruoz et al. | |
| 2004/0081245 A1 * | 4/2004 | Deeley et al. | 375/253 |
| 2004/0096002 A1 * | 5/2004 | Zdepski et al. | 375/240.26 |
| 2004/0130553 A1 * | 7/2004 | Ushida et al. | 345/531 |
| 2004/0145677 A1 * | 7/2004 | Raman et al. | 348/384.1 |
| 2005/0008331 A1 | 1/2005 | Nishimura et al. | |
| 2005/0123274 A1 * | 6/2005 | Crinon et al. | 386/69 |
| 2005/0147375 A1 | 7/2005 | Kadono | |
| 2005/0182778 A1 * | 8/2005 | Heuer et al. | 707/101 |
| 2005/0207497 A1 | 9/2005 | Rovati et al. | |
| 2006/0013321 A1 * | 1/2006 | Sekiguchi et al. | 375/240.27 |
| 2006/0083306 A1 | 4/2006 | Hsu | |
| 2006/0133500 A1 | 6/2006 | Lee et al. | |
| 2006/0256120 A1 * | 11/2006 | Ushida et al. | 345/531 |
| 2007/0006060 A1 | 1/2007 | Walker | |
| 2008/0317138 A1 | 12/2008 | Jia | |

FOREIGN PATENT DOCUMENTS

| | | |
|---|---|---|
| JP | 09261647 | 10/1997 |
| JP | 2000049621 A | 2/2000 |
| KR | 1020030016859 | 3/2003 |
| WO | 01/24425 | 4/2010 |

OTHER PUBLICATIONS

Non Final Office Action, Mail Date Jul. 20, 2009; U.S. Appl. No. 11/901,484.

* cited by examiner

| FRAMEHDR | MB0HDR |
| MB0DATA | MB1HDR |
| MB1DATA | MB2HDR |
| MB2DATA | PKTHDR |
| MB3HDR | MB3DATA |
| PKTHDR | MB4HDR |

| MB0HDR | MB0DATA |
| MB1HDR | MB1DATA |
| MB2HDR | MB2DATA |
| MB3HDR | MB3DATA |

VARIABLE-LENGTH CODING DATA TRANSFER INTERFACE

FIELD OF THE INVENTION

The invention generally relates to computer systems, and more particularly relates to the interface between a Variable-Length Coding (VLC) device and a data transfer (e.g., direct memory access) device for MPEG-4.

BACKGROUND OF THE INVENTION

Moving Pictures Experts Groups (MPEG) is an International Standards Organization (ISO) standard for compressing video data. Video compression is important in making video data files, such as full-length movies, more manageable for storage (e.g., in optical storage media), processing, and transmission. In general, MPEG compression is achieved by eliminating redundant and irrelevant information. Because video images typically consist of smooth regions of color across the screen, video information generally varies little in space and time. As such, a significant part of the video information in an image is predictable and therefore redundant. Hence, a first objective in MPEG compression is to remove the redundant information and leaving only the true or unpredictable information. On the other hand, irrelevant video image information is information that cannot be seen by the human eye under certain reasonable viewing conditions. For example, the human eye is less perceptive to noise at high spatial frequencies than noise at low spatial frequencies and less perceptive to loss of details immediately before and after a scene change. Accordingly, the second objective in MPEG compression is to remove irrelevant information. The combination of redundant information removal and irrelevant information removal allows for highly compressed video data files.

MPEG compression incorporates various well-known techniques to achieve the above objectives including: motion-compensated prediction, Discrete Cosine Transform (DCT), quantization, and Variable-Length Coding (VLC). DCT is an algorithm that converts pixel data into sets of spatial frequencies with associated coefficients. Due to the non-uniform distribution of the DCT coefficients wherein most of the non-zero DCT coefficients of an image tend to be located in a general area, VLC is used to exploit this distribution characteristic to identify non-zero DCT coefficients from zero DCT coefficients. In so doing, redundant/predictable information can be removed. Additionally, having decomposed the video image into spatial frequencies under DCT means that higher frequencies via their associated DCT coefficients can be coded with less precision than the lower frequencies via their associated DCT coefficients thereby allowing irrelevant information to be removed. Hence, quantization may be generalized as a step to weight the DCT coefficients based on the amount of noise that the human eye can tolerate at each spatial frequency so that a reduced set of coefficients can be generated.

Compressed video data is vulnerable to transmission errors. MPEG-4 offers error resilience tools to localize the effects of errors, re-establish synchronization, and recover erroneous data. The end result is more reliable data transmission. These tools include data partition, packetization, and reversible VLC (RVLC). Data partitioning is designed to localize and isolate the effects of errors by separating and partitioning motion and shape data from texture data in a video packet. The data partition mode utilizes DC-markers (for intra-frames) and motion markers for (inter-frames) to achieve these objectives. The data partition mode also involves a different way to code the coefficients. A video packet is made up of one or several macroblocks. A frame (a.k.a. Video Object Plane in MPEG-4 terminology) may consist of zero, one, or several packets. Each packet starts with markers and the packet header. The data in each packet are encoded independently relative to other packets. Data partition mode in MPEG-4 requires data in any packet to be divided into three parts. Each part consists of bitstream components from all macroblocks in the packet. During data partition mode, a packet size (i.e., the number of data bits in the packet) is limited to 2048 bits for simple profile level-1 video bitstream, 4096 bits for simple profile level-2 video bitstream, and 8192 bits for simple profile level-3 video bitstream.

Video packetization mode utilizes Resynchronization Marker (RSM) and Header Extension Code (HEC) before the first macroblock during encoding. When data is corrupted or damaged, during the decoding process, the non-recoverable data can be localized and discarded until the next RSM. In the event the VOP code is corrupted, HEC provides additional information to enable the decoder to determine to which VOP a resync packet belongs. RVLC mode requires that texture data to be capable of being decoded in both the forward and reverse directions thereby enabling the decoder to better localize the error between two RSMs. This is achieved through the use of prefix property (same as regular VLC) and suffix property.

Under MPEG-4, there are different bit packing formats for output VLC data. In the bypass mode data is encoded only at the macroblock layer. Hence, data is formatted such that a macroblock header precedes the macroblock data. FIG. 1A illustrates as an example the bypass bit packing format wherein $MB_0hdr$ is the header associated with macroblock 0, $MB_0data$ is the data associated with macroblock 0, $MB_1hdr$ is the header associated with macroblock 1, $MB_1data$ is the data associated with macroblock 1, and so on. In the VLC mode with no data partition, data is formatted as illustrated in FIG. 1B. As shown in FIG. 1B, a frame header is at the beginning follows by $MB_0hdr1$ the header associated with macroblock 0, $MB_0hdr2$ the motion vector data associated with macroblock 0 (which is needed if an inter-macroblock is involved), $MB_0data$ the data/texture associated with macroblock 0. The pattern repeats for subsequent macroblocks. At some point (e.g., after macroblock 7) of the bitstream data, a new data packet begins with a packet header which is followed by $MB_8hdr1$ the header associated with macroblock 8, $MB_8hdr2$ the motion vector data associated with macroblock 0 (which is needed if an inter-macroblock is involved), $MB_8data$ is the data/texture associated with macroblock 8, and the pattern described above is repeated.

In the VLC mode with data partition, data can be formatted three different ways as illustrated in FIG. 1C-1E. In the first format which is designed to accommodate an intra-macroblock in an I-frame, the six DC coefficients for the different blocks in a macroblock are included together with the header data 1. More particularly, as shown in FIG. 1C, a frame header is at the beginning to be followed by header data 1 with the DC coefficients, header data 2 associated with the motion vector data associated with the present macroblock (which is needed if an inter-macroblock is involved), and finally the texture (macroblock) data. The pattern repeats for subsequent macrobocks. Since data partition is involved, a DC marker is typically inserted between the header data 1 with DC coefficients and the header data 2 if the macroblock type is intra. Motion marker is inserted if the macroblock type is inter. At some point (e.g., after macroblock 3) of the bitstream data, a new data packet begins with a packet header which is followed by header data 1 with the DC coefficients, header data 2, and the macroblock data. The pattern described above is repeated.

In the second format which is designed to accommodate an intra-macroblock in a P-frame, the six DC coefficients for the different blocks in a macroblock are included together with the header data 2. More particularly, as shown in FIG. 1D, a frame header is at the beginning to be followed by header data 1, header data 2 with the DC coefficients, and finally the texture (macroblock) data. The pattern repeats for subsequent macrobocks. Header data 2 is the motion vector data associated with the present macroblock (which is needed if an inter-macroblock is involved). Since data partition is involved, a motion marker is typically inserted between the header data 2 with DC coefficients and the texture data if the macro-block type is inter. DC Marker is inserted if the macroblock type is intra. At some point (e.g., after macroblock 3) of the bitstream data, a new data packet begins with a packet header which is followed by header data, follows by header data 2 with the DC coefficients, follows by the macroblock data.

In the third format which is designed to accommodate an inter-macroblock in a P-frame, the six DC coefficients for the different blocks in a macroblock are included together with the texture (macroblock) data. More particularly, as shown in FIG. 1E, a frame header is at the beginning to be followed by header data 1, header data 2, and the texture (macroblock) data with the DC coefficients. The pattern repeats for subsequent macrobocks. Header data 2 is the motion vector data associated with the present macroblock (which is needed if an inter-macroblock is involved). Since data partition is involved, a motion marker DC marker is typically inserted between the texture data with DC coefficients and the next section of the sequence if the macro-block type is inter. DC Marker is inserted if the macroblock type is intra. At some point (e.g., after macroblock 3) of the bitstream data, a new data packet begins with a packet header which is followed by header data 1, header data 2, and the macroblock data with the DC coefficients. The bit packing formats for the RVLC mode with and without data partition are identical to those described earlier for the VLC mode with and without data partition, respectively.

Wireless data transmission standards such as h.263 have substantially similar bit packing formats as those for VLC and RVLC mode with data partition described above. However, the only difference is that packet headers for the h.263 standard are shorter in length than those for MPEG-4.

Conventionally, to perform bit packing in different formats such as those described earlier, a VLC memory is required to store the output VLC data components (e.g., header data, texture data, etc.). The VLC data components are stored in the VLC memory in which headers and motion vectors are received out of sequence with associated texture data. The memory interface unit selectively accesses the appropriate data stored in the VLC memory one component at a time and then writes it into a different memory location of the same VLC memory used in stitching together the data according to the required format. Hence, this different memory location stores the data as it is being packed/assembled and/or formatted at various phases of completion. At completion, the packed and/or formatted data is then read and written to the desired destination (e.g., a memory). This approach is not desirable because of the large VLC memory required to store the VLC data and the partially assembled/packed data at different stages as well as the intensive processing power required to read and write data components from/to the VLC memory during the assembling/formatting process. Moreover, because additional read and write operations for output at completion are required, additional valuable computing resources are required. Furthermore, the above approach requires a great deal of synchronization because the data components are generated and/or updated at different times.

Thus, a need exists for a method and apparatus to pack VLC video data in different formats that require less memory, processing resources, and synchronization.

SUMMARY OF THE INVENTION

Accordingly, the present invention provides a method and apparatus to pack VLC video data in different formats that require less memory, processing resources, and synchronization.

The present invention meets the above need with a memory interface to perform data bit packing according to different selectable formats. The memory interface comprises a buffer, a memory, and a data transfer logic. The buffer stores different categories of data received from a data source in corresponding sections. In the preferred embodiment, the data source is a Variable Length Coding (VLC) module. The data transfer logic is connected between the buffer and the memory. Depending on a selected format, the data transfer logic receives data from the buffer and directly transfers the data to the memory such that when the transferred data is received in the memory, the transferred data is organized according to the selected format. In so doing, no extra memory access (e.g., read and/or write operations) is required, no extra memory is needed to store the partially assembled data, and no complicated synchronization is needed. In the preferred embodiment, the data transfer logic further performs adjustments on the transferred data such as byte-aligning, byte-stuffing, etc as may be dictated by the selected format.

All the features and advantages of the present invention will become apparent from the following detailed description of its preferred embodiments whose description should be taken in conjunction with the accompanying drawings.

BRIEF DESCRIPTION OF THE DRAWINGS

FIG. 8A illustrates an examplary data storage structure in the encoded bitstream buffer of memory 404 at the conclusion of a bypass-I or a bypass-P data transfer.

FIG. 8B illustrates an examplary data storage structure in the encoded bitstream buffer of memory 404 at the conclusion of either a VLC non-data partition or RVLC non-data partition data transfer.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention applies to MPEG-4 bit packing formats, it is to be appreciated that the present invention is also applicable to bit packing formats for other standards involving video, audio, text, software, and other types of data.

In accordance to the present invention, digital data is packed/assembled according to a format selectable from a number of formats while the data is being transferred to a desired destination. In one embodiment, the digital data involved is the VLC output data, the desired destination is a memory, and the memory transfer mode is Direct Memory Transfer (DMA). More particularly, an interface is provided in which the VLC output data is separated into different data components according to categories (e.g., headers, texture data, and others) and stored in separate corresponding locations in a VLC output buffer. In response to request and command signals from the VLC, the Reduced Instruction Set Codes (RISC) data transfer core directly sends the data components to locations in a destination memory such that the data components are arranged according to the desired packing format. The RISC data transfer core further make adjustments (e.g., insert stuffing bytes) to the data components as required by the commands. In so doing, no additional memory is required to store partially assembled/packed data at different stages of completion, no additional read and write operations are required to transfer the complete assembled/packed and/or formatted data, and no complex synchronization scheme is required. Accordingly, the amount of required memory, processing resources, and logic are minimized while data throughput is increased.

Figure 1A:
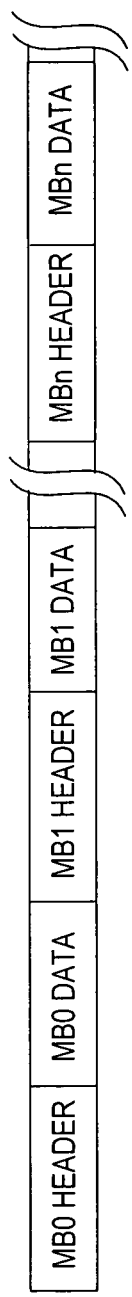
FIGS. 1A-1E illustrates, as examples, the different VLC packing data formats for MPEG-4.
Figure 1B:
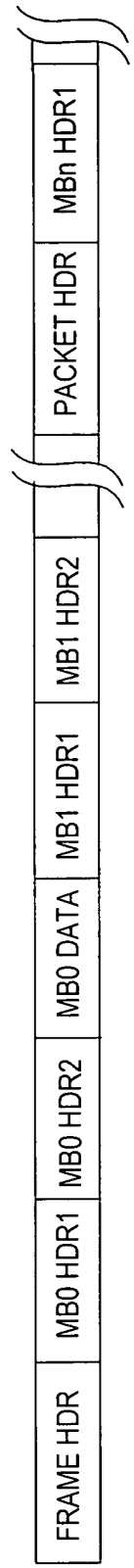
Figure 1C:
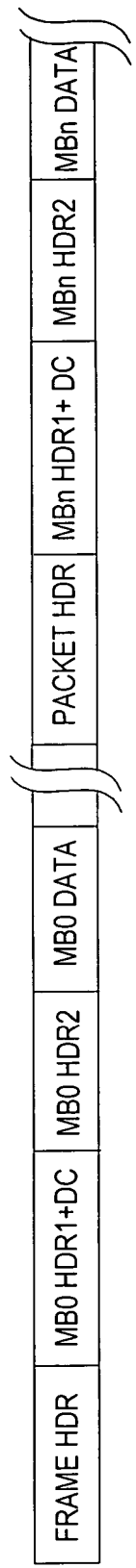
Figure 1D:
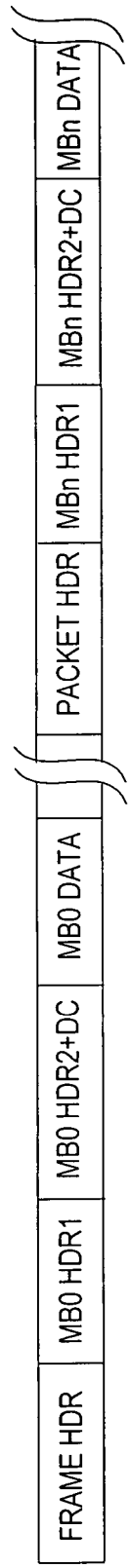
Figure 1E:
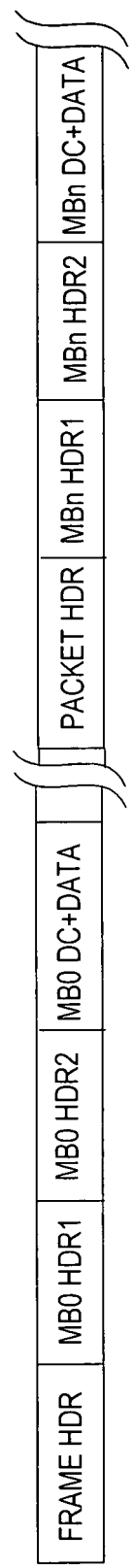
Figure 2:
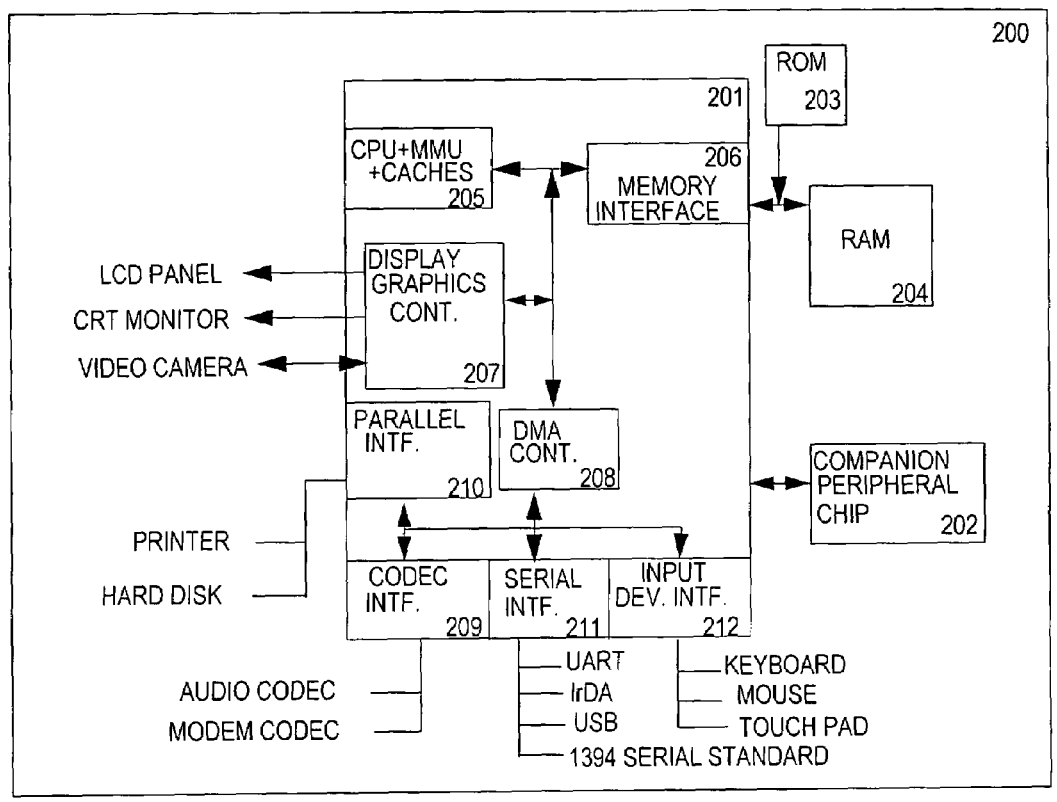
FIG. 2 illustrates, for example, a high-level diagram of a computing device 200 which implements the present invention.

Reference is now made to FIG. 2 illustrates, as an example, a high-level diagram of computer system 200 in which the present invention may be implemented or practiced. More particularly, computer system 200 may be a laptop or handheld computer system. It is to be appreciated that computer system 200 is exemplary only and that the present invention can operate within a number of different computer systems including desktop computer systems, general-purpose computer systems, embedded computer systems, and others.

As shown in FIG. 2, computer system 200 is a highly integrated system which includes of integrated processor circuit 201, peripheral controller 202, read-only-memory (ROM) 203., and random access memory (RAM) 204. The highly integrated architecture allows power to be conserved. Peripheral controller 202 is optional if there is a need to interface with complex and/or high pin-count peripherals that are not provided in integrated processor circuit 201.

While peripheral controller 202 is connected to integrated processor circuit 201 on one end, ROM 203 and RAM 204 are connected to integrated processor circuit 201 on the other end. Integrated processor circuit 201 comprises a processing unit 205, memory interface 206, graphics/display controller 207, direct memory access (DMA) controller 208, and core logic functions including encoder/decoder (CODEC) interface 209, parallel interface 210, serial interface 211, and input device interface 212. Processing unit 105 integrates a central processing unit (CPU), a memory management unit (MMU), together with instruction/data caches.

CODEC interface 209 provides the interface for an audio source and/or modem to connect to integrated processor circuit 101. Parallel interface 210 allows parallel input/output (I/O) devices such as hard disks, printers, etc. to connect to integrated processor circuit 201. Serial interface 211 provides the interface for serial I/O devices such as Universal Asynchronous Receiver Transmitter (UART), Universal Serial Bus (USB), and Firewire (IEEE 1394) to connect to integrated processor circuit 201. Input device interface 212 provides the interface for input devices such as keyboard, mouse, and touch pad to connect to integrated processor circuit 201.

DMA controller 208 accesses data stored in RAM 204 via memory interface 206 and provides the data to peripheral devices connected to CODEC interface 209, parallel interface 210, serial interface 211, or input device interface 212. DMA controller 208 also sends data from CODEC interface 209, parallel interface 210, serial interface 211, and input device interface 212 to RAM 204 via memory interface 206. Graphics/display controller 207 requests and accesses the video/graphics data from RAM 204 via memory interface 206. Graphics/display controller 207 then processes the data, formats the processed data, and sends the formatted data to a display device such as a liquid crystal display (LCD), a cathode ray tube (CRT), or a television (TV) monitor. In computer system 200, a single memory bus is used to connect integrated processor circuit 201 to ROM 203 and RAM 204.

Figure 3:
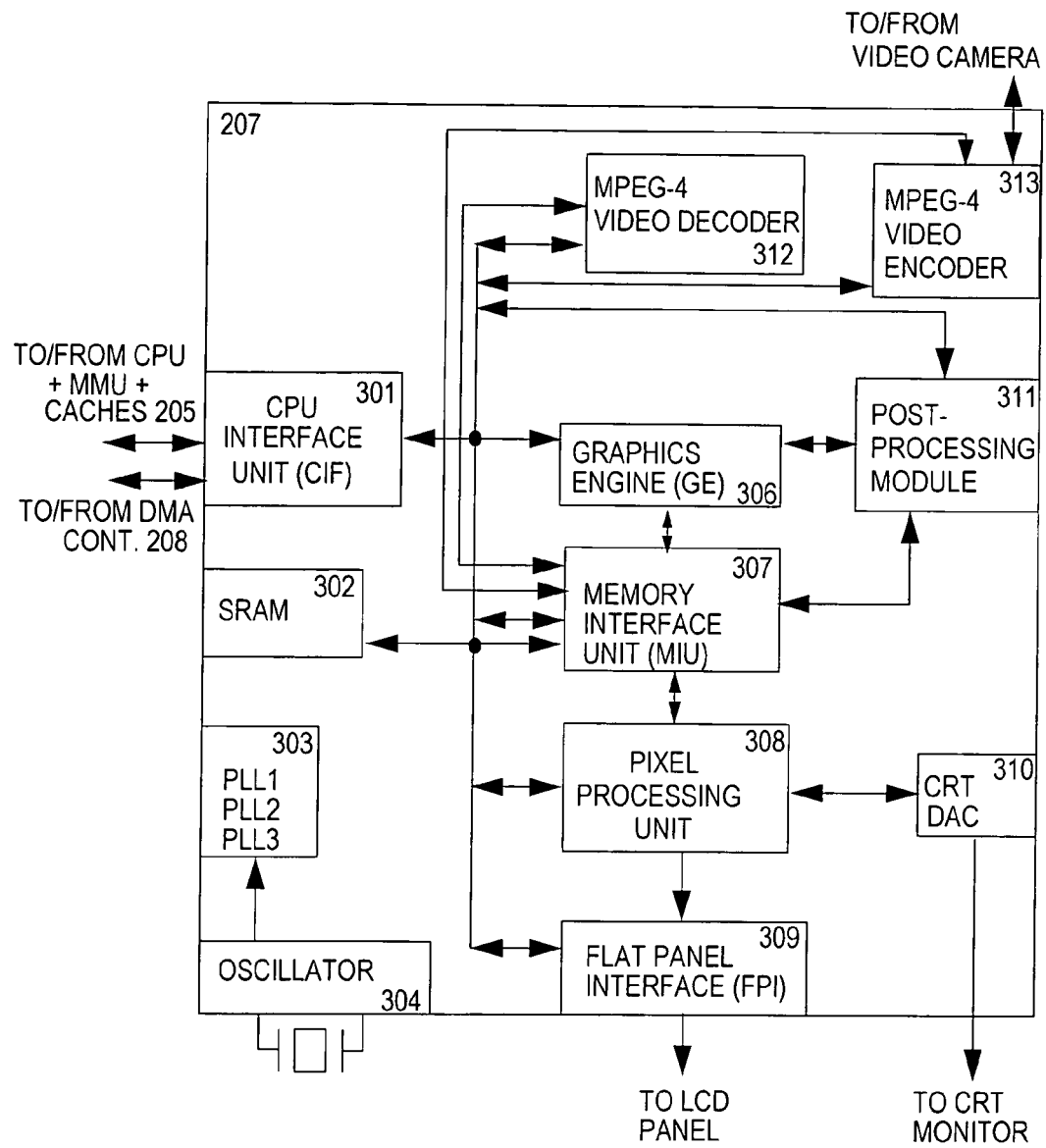
FIG. 3 illustrates in greater detail graphics/display controller 207 of the computing device 200.

In the current embodiment, the present invention is implemented as part of graphics/display controller 207. Reference is now made to FIG. 3 illustrating in greater detail graphics/display controller 207. In general, graphics/display controller 207 comprises CPU Interface Unit (CIF) 301, SRAM 302, Phase Lock Loop (PLL) circuit 303, oscillator 304, pixel processing logic 308, Graphics Engine (GE) 306, Memory Interface Unit (MIU) 307, Flat Panel Interface (FPI) 309, CRT Digital-to-Analog Converter (DAC) 310, post-processing module 311, MPEG-4 video decoder 312, and MPEG-4 video encoder 313. Graphics/display controller 207 further includes a video input port to accommodate a video camera or any other input video signal including playback of a stored video input whether analog or digital. CIF 301 provides the interface to processing unit 205 and DMA controller 208. Accordingly, CIF 301 routes requests and video/image data received from processing unit 205 to the desired destination. In particular, CIF 301 sends register read/write requests and memory read/write requests from the host CPU processing unit 205 and DMA controller 208 to the appropriate modules in graphics/display controller 207. For example, memory read/write requests are passed on to MIU 307 which in turn reads/writes the data from/to the frame buffer in SRAM 302. CIF 301 also serves as the liaison with DMA controller 208 to fetch data from system memory (ROM 203 and RAM 204) and provides the data to GE 306 and MIU 307. Further, CIF 301 has a number of control registers which can be programmed by the host CPU in processing unit 205 to control the MPEG post-processing process (e.g., the content of some of the control registers may be used to configure MPEG-4 decoder 312). CIF 301 also passes compressed video/image bitstream to MPEG-4 decoder 312 to perform image construction/decompression. CIF 301 further passes uncompressed video/image bitstream received from a source connected to codec interface 209 or serial interface 211 to MPEG-4 encoder 313 to perform compression before the compressed bitstream can be transmitted to a device connected directly or remotely to integrated processor circuit 201.

The frame buffer in SRAM 302 is used to store the pixmap (i.e., a pixel pattern mapped into the frame buffer) of the image to be displayed on the monitor as well to act as a temporary buffer for various purposes. Additionally, SRAM 302 may have memory allocated for video buffers and transactional registers. GE 306 processes graphics/video image data which is then stored in the buffer in SRAM 302 based on commands issued by the host CPU. GE 306 performs graphics operations (e.g., BitBLTs and ROPs, area fills, line drawing) and provides hardware support for clipping, transparency, rotation, color expansion, and others. GE 306 through a built-in Stretch Block Transfer (STRBLT) function further performs video image expansion, progressive scanning conversion, YcbCr (YUV) to RGB color-space conversion, etc. In short, GE 306 frees processing unit 205 from the video/graphics display rendering function to allow processing unit 205 to perform time-critical or real-time operations.

MIU 307 controls all read and write transactions from/to the frame buffer, video buffers, and transactional registers in SRAM (frame buffer) 302. Such read and write requests may come from the host CPU via CIF 301, GE 306, pixel processing logic 308, FPI 309, etc. In addition, MIU 307 performs tasks associated with memory addressing, memory timing control, and others. Post-processing module 311 removes blocking and ringing artifacts from decompressed MPEG video image data to improve the quality of the decompressed video data. The decompressed MPEG video image data can be received from, for example, an optical media player via serial interface 211 or MPEG-4 decoder 312. The filtered video image data is then sent to SRAM 302.

Pixel processing logic 308 retrieves video/graphics data from the buffers in SRAM 302 via MIU 307, serializes the image data into pixels, and formats the pixels into predetermined formats before outputting them to FPI 309 or CRT DAC 310. Accordingly, pixel processing logic 308 generates the required horizontal and vertical display timing signals, memory addresses, read requests, and control signals to access image data stored in SRAM 302. If the display device involved is a LCD, pixel data from pixel processing logic 308 is sent to FPI 309 before being passed on to the LCD. FPI 309 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 309 formats the data to suit the type of display. Furthermore, FPI 309 allows color data to be converted into monochrome data in the event a monochrome LCD is used. Conversely, if the display device is a cathode ray tube (CRT), pixel data is provided to CRT digital-to-analog converter (DAC) 310 prior to being sent to the CRT. CRT DAC 310 converts digital pixel data from pixel processing logic 308 to analog Red Green and Blue (RGB) signals to be displayed on the CRT monitor.

Figure 4:
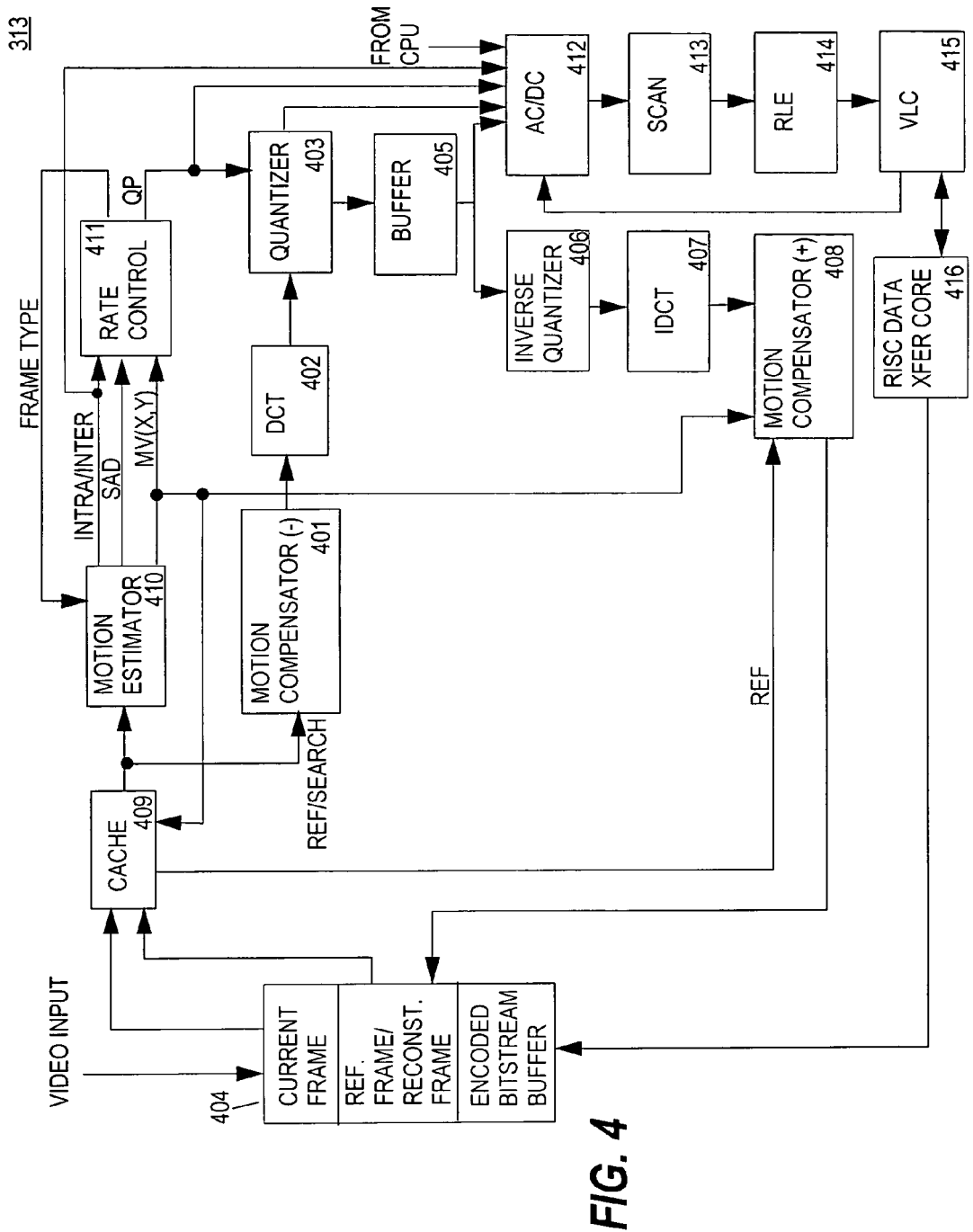
FIG. 4 illustrates the relevant components of an embodiment of MPEG encoder 313 which implements the present invention.

Reference is now made to FIG. 4 illustrating in greater detail exemplary MPEG-4 video encoder 313 that implements an embodiment of the present invention. As shown in FIG. 4, MPEG-4 video encoder 313 includes motion compensator (−) (MC−) 401, DCT module 402, quantizer 403, memory 404, buffer 405, inverse quantizer 406, Inverse DCT (IDCT) module 407, motion compensator (+) (MC+) 408, cache 409, motion estimator 410, rate control module 411, alternative coefficient/discrete coefficient (AC/DC) module 412, scan module 413, run-length event (RLE) module 414, variable length coding (VLC) 415, and risc data transfer core 416. It is clear that the scope of the present invention covers embodiments in which the MPEG-4 video encoder (i.e., the video encoding function) resides externally and independently of graphics/display controller 207.

Video input from a source such as a video camera connected to system 200 is provided to memory 404. The video input from the source is the current video frame data. Memory 404 is separated into a current frame area to store data from the current video input, a reference frame/reconstructed frames area to store data from the reference video frame and data from a video frame reconstructed from compression, and an encoded bitstream buffer to store data from a freshly encoded video frame by encoder 313. Cache 409 fetches current video frame data from memory 404 one macroblock at a time and reference video frame data several macroblocks at a time (these several macroblocks are adjacent neighbors). Cache 409 receives as input the motion vectors associated with the "good" match video block determined from motion estimator 410. Cache 409 provides data from the current video frame and data from the reference video frame to MC− 401 and motion estimator 410 based on the motion vectors of the "good" match video block received. Cache 409 also provides data from the reference video frame to MC+ 408 based on the motion vectors of the "good" match video block received. Each macroblock typically has six blocks of data (YUV 4:2:0) in which four (Y0-Y3) are luminance data and two (U & V) are chrominance data.

MC− 401 is essentially a subtractor in which prediction data from a reference video frame is subtracted from data from a current video frame, which has been presented in the correct order for encoding according to the desired Group Of Pictures (GOP) structure. The subtractor is bypassed (e.g., the prediction is set to zero) for I-frames or I-macroblocks. The output of MC− 401, which is the prediction error (or the video input in the case of I-frames), is passed to DCT module 402 which performs the Discreet Cosine Transformation (DCT) and outputs DCT coefficients to quantizer 403. The DCT coefficients generally include a single DC coefficient and a number of AC coefficients. Some of the AC coefficients are non-zero. While the DC coefficient represents the average value in the macroblock, the AC coefficients represent various harmonic frequencies in the macroblock. The DCT coefficients are arranged in a coefficient block that is equivalent in size (8×8) to the pixel block. Quantizer 403 carries out the quantization process which may be generalized as a step to weight the DCT coefficients based on the amount of noise that the human eye can tolerate at each spatial frequency so that a reduced set of coefficients can be generated. This may be generally accomplished by scaling the coefficient signals using a scalar value $Q_P$. This causes some of the small coefficients to be divided down and truncated to zero thereby reducing the number of quantization levels available for encoding. The quantized DCT coefficients are provided to buffer 405 for temporary storage before they are passed on to AC/DC prediction module 412 and inverse quantizer 406. In the preferred embodiment, buffer 405 is 48 rows deep×96 bits wide dual port SRAM with one port dedicated for write operations from quantizer 403 and the other port dedicated for read operations to inverse quantizer 406 and AC/DC prediction module 412.

AC is typically defined as a DCT coefficient for which the frequency in one or both dimensions is non-zero (higher frequency). DC is typically defined as a DCT coefficient for which the frequency is zero (low frequency) in both dimensions. AC/DC prediction module 412 predicts the AC and DC for the current block based on a gradient prediction analysis of the AC and DC values of adjacent blocks such as an adjacent left top block, a top block, and an adjacent left block. For example, the prediction can be made as follows:

if $(|B-A| \geq |B-C|)$ then $X=A$ else $X=C$ where B is the AC or DC value of the left top block relative to the current block, C is the AC or DC value of the top block relative to the current block, A is the AC or DC value of the left block relative to the current block, and X is the AC or DC value of the current block.

Buffer 405 stores the AC and DC coefficients values of the current macroblock X and at least the AC and DC coefficient values of adjacent macroblocks A, B, and C relative to the current macroblock X. Adjacent macroblocks A, B, and C are all processed before the current macroblocks so buffer 405 stores the coefficients of a predetermined number of processed macroblocks received over time from quantizer 403. As each new macroblock is processed, the content of buffer 405 is updated/reorganized to reflect the appropriate adjacent macroblocks A, B, and C.

AC/DC prediction module 412 has a predetermined number of AC prediction modes. AC/DC prediction module 412 selects one of the prediction modes and generates an AC prediction flag to identify a mode of operation. AC/DC prediction module 412 outputs a DC residual signal, AC signals (representing either AC coefficients or AC residuals), and AC prediction flag. Additional bandwidth efficiency can be achieved by tying a scan direction of VLC module 415 to AC/DC gradient prediction. For this reason, AC/DC prediction module 412 provides the AC and DC predicted coefficients to scan module 413 which forms a 64-elements long vector from the two-dimensional array macroblock such that the low frequency (e.g., DC) components are placed at the beginning of the vector. The gradient analysis and inter/intra analysis performed in AC/DC prediction module 412 is used to select one of three scan directions: Alternate-Horizontal, Alternate-Vertical, and ZigZag (ZZ). The scan direction dictates the order the AC & DC coefficients are accessed by scan module 412 to form the 64-elements vector.

Scan module 413 provides the vector of up-to 64-elements to RLE module 414 to generate run-level events. In general, RLE module 414 determines the number of consecutive zeros in the vector and forms RLE acceptable words based on the determination. After quantization, there are likely a significant number of zeros (likely to be the high frequency components) in the block and there is no need to transmit or store such information. Accordingly, a RLE word represents the number of zeros between consecutive non-zero elements in the vector. The RLE word also includes the value of the last non-zero element after the zeros and information indicating whether this value is the very last component in the vector.

The RLE words are provided to VLC module 404 which maps RLE words into VLC patterns. For example, certain RLE words are given specific bit pattern. The most common RLE words are given the shortest VLC bit pattern. VLC patterns are specified in MPEG-4 standard. (See "MPEG-4 Information Technology-Coding of Audio-Visual Objects-Part 2: Visual" ISO/IEC/14496-2:1999). Run-length and variable-length coding (the combination coding) are commonly referred to as Huffman coding) and can be combined into one VLC module. In general, due to the non-uniform distribution of the DCT coefficients wherein most of the non-zero DCT coefficients of an image tend to be located in a general area, VLC and run-length encoding are used to exploit this distribution characteristic to identify non-zero DCT coefficients from zero DCT coefficients. In so doing, redundant/predictable information can be removed. The encoded (i.e., compressed) block of video frame data is then sent to the encoded bitstream buffer of memory 404 via risc data transfer core 416. The interface between VLC 415 and risc data transfer core 416 is an example of the subject matter of the present invention.

The process of motion compensated prediction requires a signal on which to base the prediction. This signal represents the reference/previous video frame data which is stored in the reference cache of memory 404. To ensure that the prediction process in MPEG-4 video encoder 313 bases its prediction on a signal that is substantially similar to that available in MPEG-4 video decoder 312 (i.e., a remote video decoder), a local decoder is included in video encoder 313 to generate a locally decoded signal in the encoder. The local decoder, which consists of inverse quantizer 406, IDCT 407, and MC+ 408, basically undoes the encoding stages of quantizer 403 and DCT 342 to produce a decoded prediction error and adds it back into a suitably delayed version of the prediction (reference frame) data to produce a locally decoded (reconstructed) signal with motion compensation. The delayed prediction data is provided by cache 409.

The reconstructed signal is sent to the encoded bitstream buffer of memory 404 for storage. For each macroblock in the current video frame, motion estimator 410, which implements the present invention, searches for a "good" matched macroblock in the reference video frame based on a minimum SAD value. Motion estimator 310 receives as input blocks of current frame and reference frame data. Motion estimator 410 also receives a signal indicating the frame type from rate control module 411. Motion estimator 410 also determines the motion vector. Motion estimator 410 further determines whether a macroblock in the current video frame is intra (encoded independently) or inter (encoded after motion compensation). These determinations are communicated to rate control module 411 and AC/DC prediction module 412. The motion vector determinations are communicated to cache 409 and MC+ 408.

The rate of the bitstream output by VLC module 415 fluctuates over time depending on the content of the video data (i.e., changing scenes and objects). This variable bit rate is undesirable because the primary object of MPEG coding is to generate a constant bit rate to fit the available channel or in the case of statistical multiplexing to share a constant bit rate between several video signals. It is then important to ensure that the average bit-rate of the buffer input is the same as that of the channel and neither buffer overflows or underflows. Rate control module 311 is used to control the average bit rate at the bitstream buffer in memory 404 to stay inside an acceptable limit range to prevent overflow and underflow. To achieve the average bit rate control, rate control module 411 varies the quantization factors in quantizer 403 and AC/DC module 412. While coarser scale generates a lower average bit rate, at the expense of picture quality, a finer scale produces better pictures but at a higher average bit rate. As the buffer fills, quantizer 403 and AC/DC module 412 get coarser, which tends to reduce the average bit rate, helping the buffer to empty. Additionally, rate control module 411 takes into consideration the expected differences (e.g., through modeling projection) in bit rates generated by I and P frames.

Figure 5:
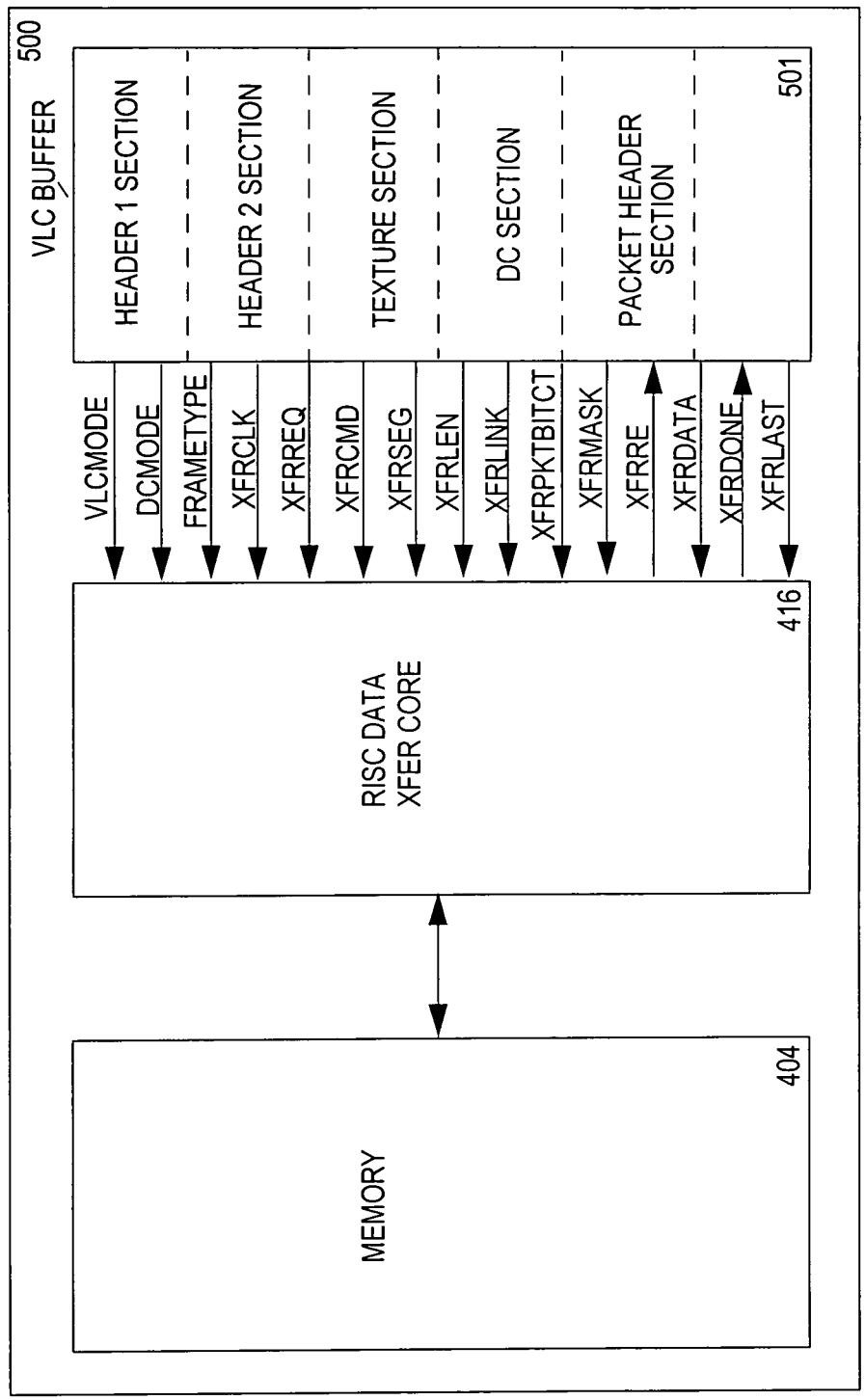
FIG. 5 illustrates the relevant components of an exemplary embodiment of VLC interface which implements the present invention.

Referring now to FIG. 5 which illustrates a block diagram of the relevant components of an exemplary embodiment of the VLC data transfer interface 500 in accordance with the present invention. As shown in FIG. 5, VLC data transfer interface includes risc data transfer core 416, buffer 501, and the encode bitstream buffer of memory 404. Risc data transfer core 416 performs the data transfer from buffer 501 to the encoded bitstream buffer of memory 404.

Buffer 501 is used to store the output VLC data. In the current embodiment, buffer 501 is a 1600-bytes buffer that is embedded in VLC module 415. It should be clear that buffer 501 can be an independent and/or external to VLC module 415. In accordance to the present invention, buffer 501 is virtually partitioned into a number of sections that are used to store different data components. In the current content the term "virtually" means that there are no actual physical partition to divide the buffer into sections. Rather, in some predetermined modes (e.g., VLC, data partition mode, and others), predetermined address ranges are assigned to corresponding sections. On the other hand, in the bypass mode involving an intra (I) frame, all header, motion vector, and texture data comes from a contiguous buffer without any partition. When buffer 501 is virtually partitioned, one section may be used to store header1 data (minimum 20 bytes), one section may be used to store header2 data (minimum 20 bytes), one section may be used to store texture data (minimum 1488 bytes), one section may be used to stored DC data (minimum 14 bytes), and one section may be used to store packet header data (minimum 118 bytes). As data components are VLC coded, they are categorized and placed in the corresponding sections of buffer 501. Each of the partitioned sections of buffer 501 has a predetermined address for easy access. Under the bypass modes, only one header data type is involved. Conversely, under the data partition and VLC non-data partition and h.263 modes, there are two header data types. Hence, in the VLC non-data partition mode, h.263 mode, and bypass mode involving an intra (P) frame, header data is stored in the header1 data section and the sections designated for header2 data and DC data are unused. Table 1 below summarizes the types of data/information components that are assigned to the different sections of buffer 501 under different data packing modes.

TABLE 1

|  | Header1 | Header2 | Texture | DC | Packet Header |
|---|---|---|---|---|---|
| Bypass | Frame Hdr & MB Hdr | NA | Data/Texture | NA | NA |
| VLC/h.263 Non-Data Partition | Frame Hdr & MB Hdr | MV Data (Only For Inter MB) | Data/Texture | NA | Packet Hdr |
| Data Partition | Frame Hdr & MB Hdr | MV Data (Only For Inter MB) | Data/Texture | DC (Only For Intra MB) | Packet Hdr |

As shown in the FIG. 5, some of the exemplary interface signals exchanged between VLC module 415 and risc data transfer core 416 include VLCMode, DCMode, FrameType, XferClk, XferRE, XferReq, XferCmd, XferLink, XferData, XferLen, XferMask, XferSeg, XferLast, XferDone, and XferPktBitCnt.

Signal VLCMode indicates the bit packing format for the associated VLC data. VLCMode=00 indicates the bypass mode format, VLCMode=01 indicates the VLC non-data partition mode format and h.263 mode format, and VLCMode=11 indicates the VLC data partition mode format and RVLC data partition mode format.

Signal DCMode indicates how to insert the DC data into the bitstream in the data partition mode. DCMode 00 indicates DC data is to be inserted into the Header1 section, DCMode 01 indicates DC data is to be inserted into the Header2 section, and DCMode 11 indicates DC data is to be inserted into the Texture data section.

Signal FrameType indicates the frame type for the associated data. FrameType=0 indicates an I (intra) frame. FrameType=1 indicates a P (inter) frame. Signal XferClk is the clock signal used in data transfer read operations. Signal XferRE is the data transfer Read Enable signal used in indicating that risc data transfer core 416 is ready to perform a read operation. Signal XferReq is the signal used by VLC module 415 to indicate that it is ready to transfer the current macroblock data.

Signal XferCmd indicates the command to be performed by risc data transfer core 416 in conjunction with the current XferReg signal. In other words, the command is latched on the current request. As examples, XferCmd=000 (i.e., simple transfer command) commands that data in buffer 501 be transferred to memory 404 without any adjustment. The bit pointer is kept intact for the next transfer. XferCmd=001 (i.e., byte-align) commands that data in buffer 501 be transferred to memory 404 and the transfer operation is completed on the current byte boundary with stuffing bytes added to the end of the current byte regardless of the XferLen and XferMask signals. In other words, a byte alignment is performed in which the data transfer bit pointer is updated to the next byte address at the end of the current buffer transfer so as to allow certain types of data such as frame and packet headers to start on a new byte boundary. XferCmd=010 (i.e., byte-stuff no align) commands that data in buffer 501 be transferred to memory 404 followed by a number of stuffing bytes as indicated by the XferLen signal. There is no byte alignment and the bit pointer is kept intact for the next transfer. A byte-stuff operation is typically used during data partition mode which requires a minimum number of bits per packet (e.g., 1024 bits/packet for level-0, 2048 bits/packet for level-1, 4096 bits/packet for level-2, and 8192 bits/packet for level-3). To avoid the need of a larger buffer 501 and reduce the amount of transferred data, stuffing bytes are inserted after the current packet header or between sequential packet headers to meet the packet minimum. A byte-stuff operation may also be used when there is minimum packets per frame. XferCmd=011 (i.e., stuff bytes with align) commands that data in buffer 501 be transferred to memory 404 followed by a byte-alignment wherein stuffing bytes are added to the end of the current byte. The data transfer bit pointer is updated to the next byte address. A number of stuffing bytes as indicated by XferLen are then added at the end to perform a byte-stuff operation. XferCmd=100 (i.e., start new frame) commands that data in buffer 501 be transferred to memory 404 beginning a the next memory location (e.g., the next 128-bit boundary). XferCmd=101 (i.e., start new packet) commands that data in buffer 501 be transferred to memory 404 beginning at the next byte location or beginning at the current byte location if already byte aligned. XferCmd=110 (i.e., flush) commands that data in a bit-shifter internal of the risc data transfer core be flushed to synchronize data at the end of frame and packet boundaries.

Signal XferLink commands that the packet start addresses and packet end addresses of the current transfer be recorded in the link list buffer to be used to locate packets in memory 404. Signal XferData indicates the transferred data. Signal XferSeg indicates the segment/section of buffer 501 from which the current data is being transferred. XferSeg=000 indicates header data and frame header (i.e., section header 1). XferSeg=001 indicates motion vector data (i.e., section header 2). XferSeg=010 indicates texture data. XferSeg=011 indicates packet header. XferSeg=100 indicates DC coefficients. Signal XferLen indicates the byte length of the current segment/section of buffer 501 from which data is being transferred. Signal XferMask indicates the number of bits in the last byte or the lower three bits of the total transfer length (XferLen) in bits wherein the upper bits are the transfer length and can be interpreted as the number of bytes in the transfer. Signal XferMask is used to generate a bit mask which is used with the transfer length (XferLen) to get a bit length of data. Signal XferPktBitCnt indicates how many bits are in the current packet. Signal XferPktBitCnt is used to drive stuff-byte command and to start new packet.

Signal XferLast indicates to risc data transfer core 416 whether the current section/segment is the last section to be transferred. XferLast=0 indicates the current segment is not the last segment to be transferred on this request. XferLast=1 indicates the current segment is the last segment to be transferred on this request. Signal XferDone indicates to VLC module 415 that the current segment of buffer 501 has been transferred. If signal XferDone is received when signal XferLast is low (0) transfer of the next segment is initiated by switching signal XferSeg to indicate the next segment/section of buffer 501 from which data is to be transferred. If signal XferDone is received when signal XferLast is high (1), the request (XferReq) ends when the data transfer from the current segment/section concludes.

Figure 6:
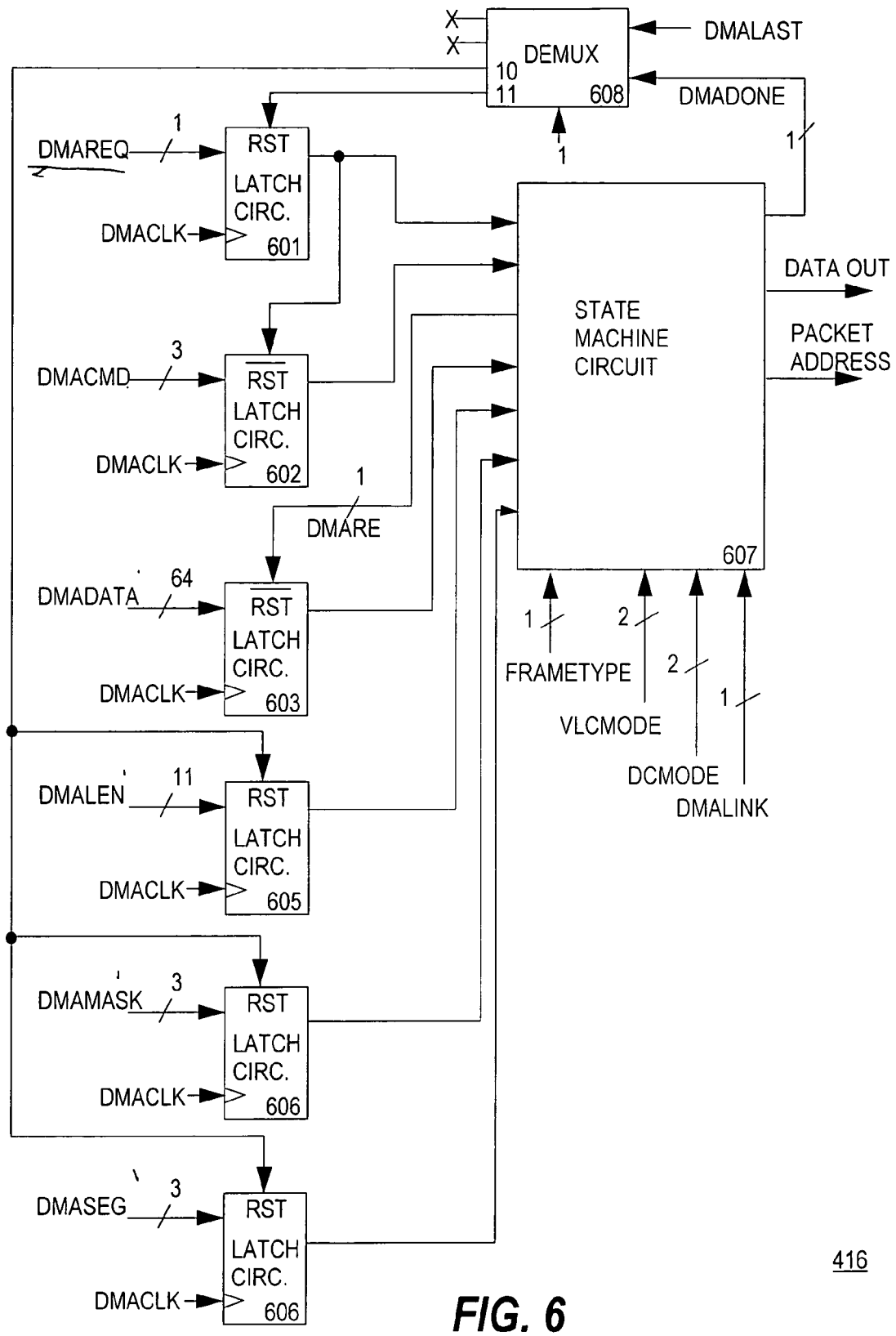
FIG. 6 illustrates the relevant components of an exemplary embodiment of risc data transfer core 416.

Reference is now made to FIG. 6 illustrating one exemplary embodiment of risc data transfer core 416. As shown in FIG. 6, risc data transfer core 416 includes latch circuits 601-606, state machine circuit 607, and demultiplexor (demux) 608. In short, latch circuits 601-606 and demux 608 combine to provide the interface between VLC module 415 and state machine 607. Signals FrameType, VLCMode, and DCMode from VLC module 415 are provided directly to state machine circuit 607. Demux 608 receives as input a high (1) input value and as control signals signal XferDone from state machine 607 and XferLast from VLC module 415. Demux 608 provides as outputs a first reset signal to latch circuit 601 and a second reset signal to latch circuits 604-606. In the current embodiment, demux 608 provides as default a low (0) output value for the first and second reset signals. When XferDone signal is high indicating that the transfer of the current section of VLC buffer 501 is complete and XferLast signal is low indicating that the current section is not the last section to be transferred for the current data transfer request, demux 608 passes the high input value to its output for the second reset signal. When XferDone signal is high indicating that the transfer of the current section of VLC buffer 501 is complete and XferLast signal is high indicating that the current section is the last section to be transferred for the current data transfer request, demux 608 passes the high input value to its output for the first reset signal.

Latch circuit 601 receives from VLC module 415 signal XferReq as input, signal XferClk as a clock signal, and a signal from demux 608 as a reset signal. In so doing, latch circuit 601 latches the XferReq signal and provides it as input to state machine 607 until it receives a high reset signal from demux 608. At which point, latch circuit 601 is reset and a new XferReq input is latched and provided as output. Latch circuit 602 receives from VLC module 415 signal XferCmd as input, signal XferClk as a clock signal, and the output (i.e., latched XferReq signal) from latch circuit 601 as a reset signal. In so doing, latch 602 latches the XferCmd signal and provides it as input to state machine 607 until it receives a low reset signal from latch 601. At which point, latch circuit 602 is reset and a new XferCmd input is latched and provided as output. Latch circuit 603 receives from VLC module 415 signal XferData as input, signal XferClk as a clock signal, and XferRE signal from state machine 607 as a reset signal. In so doing, latch circuit 603 latches the XferData signal and provides it as input to state machine 607 until it receives a low XferRE signal from state machine 607. At which point, latch circuit 602 is reset and a new XferData input is latched and provided as output. Latch circuit 604 receives from VLC module 415 signal XferLen as input, signal XferClk as a clock signal, and a signal from demux 608 as a reset signal. In so doing, latch circuit 604 latches the XferLen signal and provides it as input to state machine 607 until it receives a high reset signal from demux 608. At which point, latch circuit 604 is reset and a new XferLen input is latched and provided as output. Latch circuit 605 receives from VLC module 415 signal XferMask as input, signal XferClk as a clock signal, and a signal from demux 608 as a reset signal. In so doing, latch circuit 605 latches the XferMask signal and provides it as input to state machine 607 until it receives a high reset signal from demux 608. At which point, latch circuit 605 is reset and a new XferMask input is latched and provided as output. Latch circuit 606 receives from VLC module 415 signal XferSeg as input, signal XferClk as a clock signal, and a signal from demux 608 as a reset signal. In so doing, latch circuit 605 latches the XferMask signal and provides it as input to state machine 607 until it receives a high reset signal from demux 608. At which point, latch circuit 605 is reset and a new XferMask input is latched and provided as output.

Figure 7:
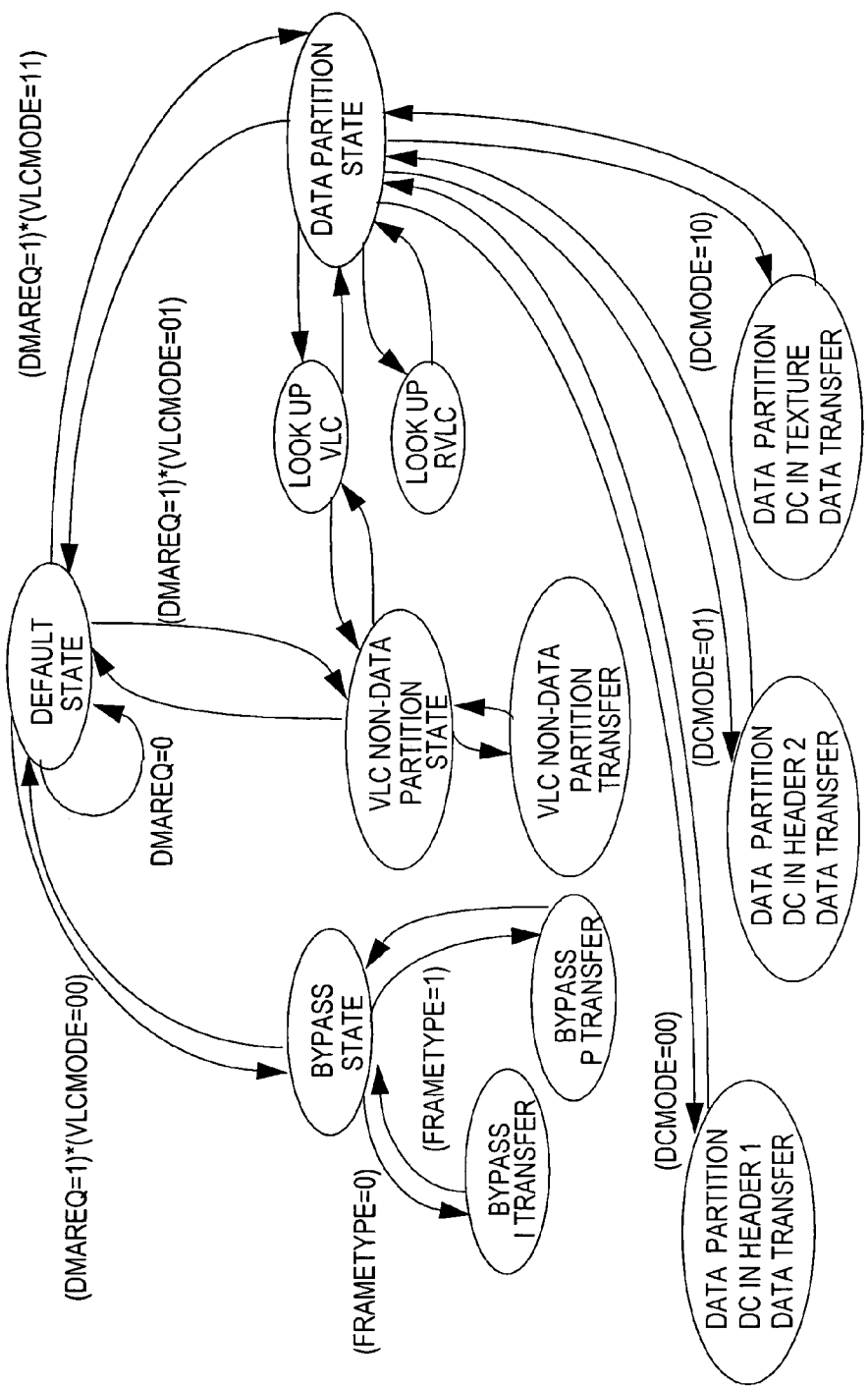
FIG. 7 illustrates some of the relevant states in an exemplary embodiment of state machine 607.

State machine 607 determines from the input signals it receives the current selected bit packing mode/state and carries out the appropriate data transfer (i.e., send data to the appropriate section of memory 404) to achieve the desired bit packing format desired for that mode/state. Reference is now made to FIG. 7 illustrating some of the relevant states in an exemplary embodiment of state machine 607. Starting in a default/initial state in which state machine 607 generates its output signals (e.g., XferDone, XferRE, etc.) that when combined with other signals such as XferLast cause latch circuits 601-606 and demux 608 to be reset and/or go into their default state. From this default state, state machine 607 monitors signal XferReq to determine if there is a request of a data transfer. If signal XferReq is deasserted (low) indicating that there is no pending data transfer request, state machine 607 remains in the default/initial state. Conversely, if signal XferReq is asserted (high) indicating there is a pending data transfer request, state machine 607 monitors signal VLCMode to determine the selected mode. If signal VLCMode has the binary value 00 indicating that the desired mode format is bypass, state machine 607 goes to state bypass. If signal VLCMode has the binary value 01 indicating that the desired mode format is VLC non-data partition or h.263, state machine 607 goes to state VLC non-data partition/h.263. Finally, if signal VLCMode has the binary value 11 indicating that the desired mode format is either VLC data partition or RVLC data partition, state machine 607 goes to state data partition.

If state machine 607 is in the bypass state, state machine 607 next monitors signal FrameType. If signal FrameType has the binary value of 0 indicating that an intra (I) frame is involved, state machine 607 executes a bypass-I data transfer in which data from buffer 501 via latch circuit 603 is sent to a predetermined address in the encoded bitstream buffer of memory 404. The amount of data to be transferred is indicated by the XferLen signal. Knowing the starting address and the amount of data to be transferred, the bit pointer is updated to reflect the current memory address in memory 404. The bypass state involves simple transfer commands without any adjustment (e.g., no byte align or stuff byte commands). In addition, state machine 607 monitors signal XferCmd to determine the corresponding command provided via latch circuit 602 and performs the data adjustment as dictated by the command. For example, if signal XferCmd has the binary value of 000, the data is transferred with no adjustment. As another example, if signal XferCmd has the binary value of 001, the data transfer is performed in which the write operation is completed on the current byte boundary with zeros added to the end of the current byte regardless of the XferLen signal. The bit pointer is updated to reflect the added zeros. Descriptions of other exemplary commands have been provided earlier. FIG. 8A illustrates an examplary data storage structure in the encoded bitstream buffer of memory 404 at the conclusion of a bypass-I data transfer. At the conclusion of a bypass-I data transfer, control is reverted back to the bypass state and subsequently to the default state for potential new transfer.

In the bypass state, if signal FrameType has the binary value of 1 indicating that an inter (P) frame is involved, state machine 607 executes a bypass-P data transfer in which data from buffer 501 via latch circuit 603 is sent to a predetermined address in the encoded bitstream buffer of memory 404. The amount of data to be transferred is indicated by the XferLen signal. Knowing the starting address and the amount of data to be transferred, the bit pointer is updated to reflect the current memory address in memory 404. The bypass state only involves simple transfer commands without any adjustment (e.g., no byte align or stuff byte commands). FIG. 8A is also used to illustrate an exemplary data storage structure in the encoded bitstream buffer of memory 404 at the conclusion of a bypass-P data transfer because the data storage structures for bypass-P and bypass-I data transfers are identical. The data (e.g., header, text, DC, etc.) involved is not VLC coded for both bypass-P and bypass-I data transfers. State machine 607 monitors signal XferSeg to determines the segment/section of VLC buffer 501 from which the current data is being transfer. State machine 607 monitors signal XferLen to determine the length (amount) of data to be output by the corresponding section of buffer 501. At the end of a data transfer for a section, state machine 607 asserts XferDone signal. At the end of a data transfer for a section, state machine 607 monitors XferLast signal to determine whether a macroblock data transfer is complete. In addition, state machine 607 monitors signal XferCmd to determine the corresponding command provided via latch circuit 602 and performs the data transfer as dictated by the command. Descriptions of exemplary commands have been provided earlier. At the conclusion of a bypass-P data transfer, control is reverted back to the bypass state and subsequently to the default state for potential new transfer.

If state machine 607 is in either the VLC non-partition state or h.263 state, state machine 607 looks up the VLC codes and executes a data transfer in which data from buffer 501 is sent to memory 404 in the following fashion: frame header data (72 bits for VLC and 50 bits for h.263 mode) generated separately by VLC module 415 is first sent to a predetermined address of memory 404, header data from the virtual header 1 data section of buffer 501 is then sent to a subsequent predetermined address of memory 404, texture data corresponding to the macroblocks of a first packet from the virtual texture data section of buffer 501 is then sent to another subsequent predetermined address of memory 404, packet header data (119 bits for VLC and 29 bits for h.263 mode) corresponding to a second packet generated by VLC module 415 is then sent to yet another subsequent predetermined address of memory 404, header data from the virtual header 1 data section of buffer 501 is then sent to a yet subsequent predetermined address of memory 404, texture data corresponding to the macroblocks of the second packet from the virtual texture data section of buffer 501 is then sent to a yet another subsequent predetermined address of memory 404. The data continues in this pattern. Knowing the starting address, the amount of data to be transferred, and other adjustments required in the corresponding command (e.g., byte align, stuff bytes, etc.), the bit pointer is updated to reflect the current memory address in memory 404. FIG. 8B illustrates an examplary data storage structure in the encoded bitstream buffer of memory 404 at the conclusion of a VLC non-data partition or h.263 data transfer. At the end of a data transfer for a section, state machine 607 asserts XferDone signal. State machine 607 monitors signal XferSeg to determines the segment/section of VLC buffer 501 from which the current data is being transfer. State machine 607 monitors signals XferLen and XferMask to determine the length (amount) and mask of the data output by the corresponding section of buffer 501. At the end of a data transfer for a section, state machine 607 monitors XferLast signal to determine whether a macroblock data transfer is complete. In addition, state machine 607 monitors signal XferCmd to determine the corresponding command provided via latch circuit 602 and performs the data adjustment as dictated by the command. Descriptions of exemplary commands have been provided earlier. Finally, in response to signal XferLink, state machine 607 monitors the addresses of the memory locations in the encoded bitstream buffer of memory 404 that store the packet start (e.g., frame header or packet header) and packet end by identifying and sending these packet start and packet end addresses to a predetermined location referred to as a link list in the encoded bitstream buffer of memory 404. In so doing, the link list can be used like an index to locate any particular packet. At the conclusion of a VLC non-data partition or h.263 data transfer, control is reverted back to the bypass state and subsequently to the default state for potential new transfer.

If state machine 607 is in the data partition state (VLC or RVLC), state machine 607 monitors signal DCMode to determine the location into which DC coefficient data is being inserted. If DCMode signal has binary value of 00 (i.e., Intra type I-frame mode), state machine 607 inserts DC data into a predetermined (e.g., predetermined address) Header 1 section of the encoded bitstream buffer of memory 404. In this case state machine 607 looks up the VLC or RVLC codes and executes a data transfer in which data from buffer 501 is sent to memory 404 in the following fashion: frame header data (72 bits for VLC and RVLC data partition mode) generated separately by VLC module 415 is first sent to a predetermined address of memory 404, header data from the virtual header 1 data section together with DC data from the DC data section of buffer 501 corresponding to a first packet are then sent to a subsequent predetermined address of memory 404, header data from the virtual header 2 data section of buffer 501 corresponding to the first packet is then sent to a yet subsequent predetermined address of memory 404, texture data corresponding to the macroblocks of the first packet from the virtual texture data section of buffer 501 is then sent to another subsequent predetermined address of memory 404, packet header data (119 bits for VLC and RVLC data partition mode) corresponding to a second packet generated by VLC module 415 is then sent to yet another subsequent predetermined address of memory 404, header data from the virtual header 1 data section together with DC data from the DC data section of buffer 501 corresponding to the second packet are then sent to a subsequent predetermined address of memory 404, header data from the virtual header 2 data section of buffer 501 corresponding to the second packet are then sent to a subsequent predetermined address of memory 404, texture data corresponding to the macroblocks of the second packet from the virtual texture data section of buffer 501 is then sent to a yet another subsequent predetermined address of memory 404. The data continues in this pattern. Finally, state machine 607 inserts DC_marker (19-bit fixed value of 0x06b001) at the end of the last macroblock of each data packet if DCMode is 00. For each section, knowing the starting address, the amount of data to be transferred, and other adjustments required in the corresponding command (e.g., byte align, stuff bytes, etc.), the bit pointer is updated to reflect the current memory address in memory 404. At the end of a data transfer for a section, state machine 607 asserts XferDone signal. State machine 607 monitors signal XferSeg to determines the segment/section of VLC buffer 501 from which the current data is being transfer. State machine 607 monitors signals XferLen and XferMask to determine the length (amount) and mask of the data output by the corresponding section of buffer 501. At the end of a data transfer for a section, state machine 607 monitors XferLast signal to determine whether a macroblock data transfer is complete. In addition, state machine 607 monitors signal XferCmd to determine the corresponding command provided via latch circuit 602 and performs the data adjustment as dictated by the command. Descriptions of exemplary commands have been provided earlier. In response to signal XferLink, state machine 607 monitors the addresses of the memory locations in the encoded bitstream buffer of memory 404 that store the packet start (e.g., frame header or packet header) and packet end by identifying and sending these packet start and packet end addresses to a predetermined location referred to as a link list in the encoded bitstream buffer of memory 404. In so, doing, the link list can be used like an index to locate any particular packet.

Figure 8D:
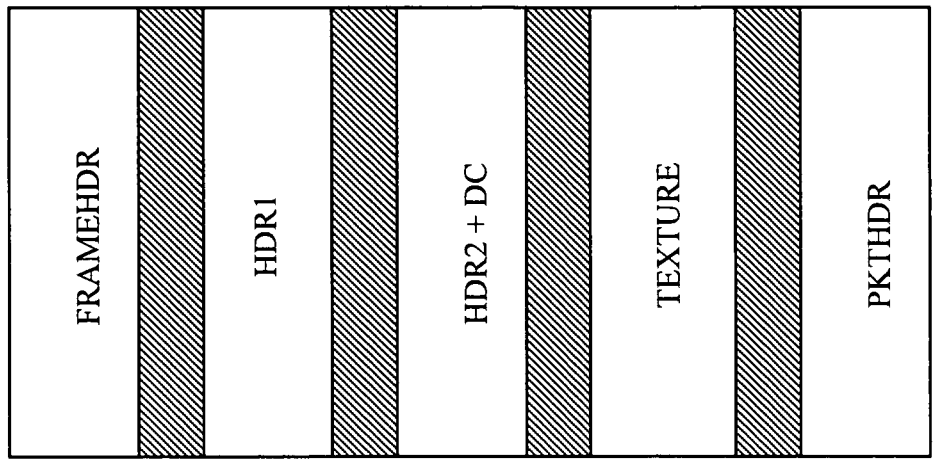
FIG. 8D illustrates an examplary data storage structure in the encoded bitstream buffer of memory 404 at the conclusion of a VLC, RVLC, or h.263 data partition data transfer for DCMode=01.
Figure 8C:
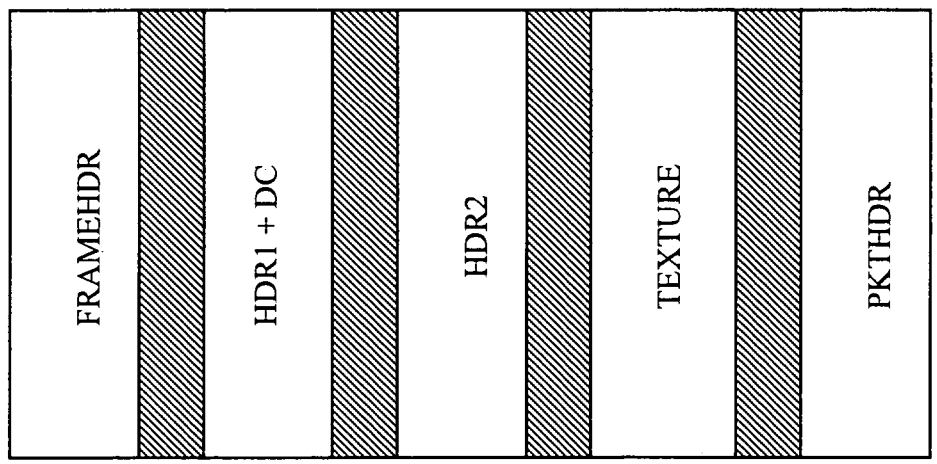
FIG. 8C illustrates an examplary data storage structure in the encoded bitstream buffer of memory 404 at the conclusion of a VLC, RVLC, or h.263 data partition data transfer for DCMode=00.

FIG. 8C illustrates an examplary data storage structure in the encoded bitstream buffer of memory 404 at the conclusion of the data transfer for DCMode=00. It is to be appreciated that under the data partition mode, each section of the encoded bitstream buffer of memory 404 is designed to store the associated data for each packet in contiguous memory locations. For example, in section Header 1+DC, the Header 1 data and the DC coefficients for a first packet are stored adjacent to the Header 1 data and the DC coefficients for a second packet and so on. At the conclusion of a DCMode=00 transfer, control is reverted back to the bypass state and subsequently to the default state for potential new transfer.

If DCMode signal has binary value of 01 (i.e., Intra type P-frame Mode), state machine 607 inserts DC data into a predetermined Header 2 section of the encoded bitstream buffer of memory 404. In this case state machine 607 looks up the VLC or RVLC codes and executes a data transfer in which data from buffer 501 is sent to memory 404 in the following fashion: frame header data (72 bits for VLC and RVLC data partition mode) generated separately by VLC module 415 is first sent to a predetermined address of memory 404, header data from the virtual header 1 data section of buffer 501 corresponding to a first packet is then sent to a subsequent predetermined address of memory 404, header data from the virtual header 2 data section together with DC data from the DC data section of buffer 501 corresponding to the first packet is then sent to a yet subsequent predetermined address of memory 404, texture data corresponding to the macroblocks of the first packet from the virtual texture data section of buffer 501 is then sent to another subsequent predetermined address of memory 404, packet header data (119 bits for VLC and RVLC data partition mode) corresponding to a second packet generated by VLC module 415 is then sent to yet another subsequent predetermined address of memory 404, header data from the virtual header 1 data section of buffer 501 corresponding to the second packet are then sent to a subsequent predetermined address of memory 404, header data from the virtual header 2 data section together with DC data from the DC data section of buffer 501 corresponding to the second packet are then sent to a subsequent predetermined address of memory 404, texture data corresponding to the macroblocks of the second packet from the virtual texture data section of buffer 501 is then sent to a yet another subsequent predetermined address of memory 404. The data continues in this pattern. Finally, state machine 607 inserts motion_marker (17-bit fixed value of 0x01f001) at the end of the last macroblock of each data packet if DCMode is 01. For each section, knowing the starting address, the amount of data to be transferred, and other adjustments required in the corresponding command (e.g., byte align, stuff bytes, etc.), the bit pointer is updated to reflect the current memory address in memory 404. At the end of a data transfer for a section, state machine 607 asserts XferDone signal. State machine 607 monitors signal XferSeg to determines the segment/section of VLC buffer 501 from which the current data is being transfer. State machine 607 monitors signals XferLen and XferMask to determine the length (amount) and mask of the data output by the corresponding section of buffer 501. At the end of a data transfer for a section, state machine 607 monitors XferLast signal to determine whether a macroblock data transfer is complete. In addition, state machine 607 monitors signal XferCmd to determine the corresponding command provided via latch circuit 602 and performs the data adjustment as dictated by the command. Descriptions of exemplary commands have been provided earlier. In response to signal XferLink, state machine 607 monitors the addresses of the memory locations in the encoded bitstream buffer of memory 404 that store the packet start (e.g., frame header or packet header) and packet end by identifying and sending these packet start and packet end addresses to a predetermined location referred to as a link list in the encoded bitstream buffer of memory 404. In so doing, the link list can be used like an index to locate any particular packet.

FIG. 8D illustrates an examplary data storage structure in the encoded bitstream buffer of memory 404 at the conclusion of the data transfer for DCMode=01. It is to be appreciated that under the data partition mode, each section of the encoded bitstream buffer of memory 404 is designed to store the associated data for each packet in contiguous memory locations. For example, in section Data/Texture, the Data/Texture for a first packet is stored adjacent to the Data/Texture for a second packet and so on. At the conclusion of a DCMode=01 transfer, control is reverted back to the bypass state and subsequently to the default state for potential new transfer.

If DCMode signal has binary value of 10 (i.e., Inter type P-frame), state machine 607 inserts DC data into a predetermined separate DC section of the encoded bitstream buffer of memory 404. In this case state machine 607 looks up the VLC or RVLC codes and executes a data transfer in which data from buffer 501 is sent to memory 404 in the following fashion: frame header data (72 bits for VLC and RVLC data partition mode) generated separately by VLC module 415 is first sent to a predetermined address of memory 404, header data from the virtual header 1 data section of buffer 501 corresponding to a first packet are then sent to a subsequent predetermined address of memory 404, header data from the virtual header 2 data section of buffer 501 corresponding to the first packet is then sent to a yet subsequent predetermined address of memory 404, texture data corresponding to the macroblocks of the first packet from the virtual texture data section of buffer 501 is then sent to another subsequent predetermined address of memory 404, DC data corresponding to the macroblocks of the first packet from the virtual DC data section of buffer 501 is then sent to yet another subsequent predetermined address of memory 404, data packet header data (119 bits for VLC and RVLC data partition mode) corresponding to a second packet generated by VLC module 415 is then sent to yet another subsequent predetermined address of memory 404, header data from the virtual header 1 data section together with DC data from the DC data section of buffer 501 corresponding to the second packet are then sent to a subsequent predetermined address of memory 404, header data from the virtual header 2 data section of buffer 501 corresponding to the second packet are then sent to a subsequent predetermined address of memory 404, texture data corresponding to the macroblocks of the second packet from the virtual texture data section of buffer 501 is then sent to a yet another subsequent predetermined address of memory 404, and DC data corresponding to the macroblocks of the second packet from the virtual DC data section of buffer 501 is then sent to yet another subsequent predetermined address of memory 404. The data continues in this pattern. Finally, state machine 607 inserts no marker if DCMode is 10 (i.e., Inter type P-frame) at the end of the last macroblock of each data packet. For each section, knowing the starting address, the amount of data to be transferred, and other adjustments required in the corresponding command (e.g., byte align, stuff bytes, etc.), the bit pointer is updated to reflect the current memory address in memory 404. At the end of a data transfer for a section, state machine 607 asserts XferDone signal. State machine 607 monitors signal XferSeg to determines the segment/section of VLC buffer 501 from which the current data is being transfer. State machine 607 monitors signals XferLen and XferMask to determine the length (amount) and mask of the data output by the corresponding section of buffer 501. At the end of a data transfer for a section, state machine 607 monitors XferLast signal to determine whether a macroblock data transfer is complete. In addition, state machine 607 monitors signal XferCmd to determine the corresponding command provided via latch circuit 602 and performs the data adjustment as dictated by the command. Descriptions of exemplary commands have been provided earlier. In response to signal XferLink, state machine 607 monitors the addresses of the memory locations in the encoded bitstream buffer of memory 404 that store the packet start (e.g., frame header or packet header) and packet end by identifying and sending these packet start and packet end addresses to a predetermined location referred to as a link list in the encoded bitstream buffer of memory 404. In so doing, the link list can be used like an index to locate any particular packet.

Figure 8E:
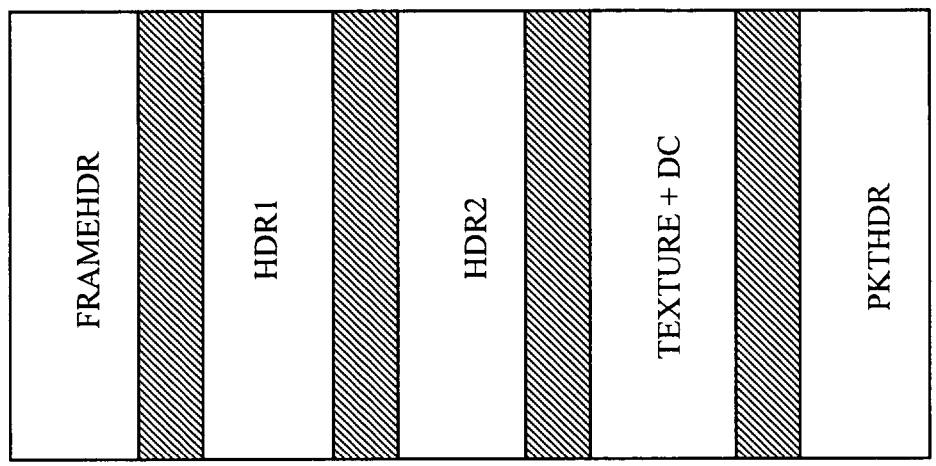
FIG. 8E illustrates an examplary data storage structure in the encoded bitstream buffer of memory 404 at the conclusion of a VLC, RVLC, or h.263 data partition data transfer for DCMode=10.

FIG. 8E illustrates an examplary data storage structure in the encoded bitstream buffer of memory 404 at the conclusion of the data transfer for DCMode=10. It is to be appreciated that under the data partition mode, each section of the encoded bitstream buffer of memory 404 is designed to store the associated data for each packet in contiguous memory locations. For example, in section Frame Header, the Frame Header for a first frame is stored adjacent to the Frame Header for a second packet and so on. At the conclusion of a DCMode=10 transfer, control is reverted back to the bypass state and subsequently to the default state for potential new transfer.

An embodiment of the present invention, a method and apparatus to pack VLC video data in different formats that require less memory, processing resources, and synchronization, is presented. While the present invention has been described in particular embodiments, the present invention should not be construed as limited by such embodiment, but rather construed according to the below claims.

What is claimed is:

1. A memory interface comprising:
a buffer comprising a plurality of sections, wherein each section of said plurality of sections is associated with a respective category of data;
a memory; and
a data transfer logic coupled to said buffer and said memory, wherein said data transfer logic is further operable to transfer data from said buffer to said memory, wherein said data transfer logic is further operable to access said data from a first set of said plurality of sections responsive to a selection of a first format, and wherein said data transfer logic is further operable to access said data from a second set of said plurality of sections responsive to a selection of a second format.

2. The memory interface of claim 1, wherein said data transfer logic is further operable to perform an adjustment on said data, wherein said adjustment is selected from a group consisting of a byte-aligning and a byte-stuffing.

3. The memory interface of claim 1, wherein said data is accessed from a MPEG-4 Variable Length Coding (VLC) device.

4. The memory interface of claim 1, wherein said plurality of sections of said buffer are selected from a group consisting of a first header section, a second header section, a data/texture section, a DC section, and a packet header section.

5. The memory interface of claim 1, wherein said first format is selected from a group consisting of bypass-I, bypass-P, VLC non-data partition, RVLC non-data partition, and data partition, and wherein said second format is selected from a group consisting of bypass-I, bypass-P, VLC non-data partition, RVLC non-data partition, and data partition.

6. The memory interface of claim 1, wherein said memory is partitioned based upon a format selected from said first format and said second format.

7. The memory interface of claim 1, wherein said memory comprises partitions corresponding to a set of said plurality of sections selected from a group consisting of said first set and said second set.

8. A system comprising:
a processor; and
a graphics controller coupled to said processor and comprising a memory interface, said memory interface comprising:
a buffer comprising a plurality of sections, wherein each section of said plurality of sections is associated with a respective category of data;
a memory; and a data transfer logic coupled to said buffer and said memory, wherein said data transfer logic is further operable to transfer data from said buffer to said memory, wherein said data transfer logic is further operable to access said data from a first set of said plurality of sections responsive to a selection of a first format, and wherein said data transfer logic is further operable to access said data from a second set of said plurality of sections responsive to a selection of a second format.

9. The system of claim 8, wherein said data transfer logic is further operable to perform an adjustment on said data, wherein said adjustment is selected from a group consisting of a byte-aligning and a byte-stuffing.

10. The system of claim 8, wherein said data is accessed from a MPEG-4 Variable Length Coding (VLC) device.

11. The system of claim 8, wherein said plurality of sections of said buffer are selected from a group consisting of a first header section, a second header section, a data/texture section, a DC section, and a packet header section.

12. The system of claim 8, wherein said first format is selected from a group consisting of bypass-I, bypass-P, VLC non-data partition, RVLC non-data partition, and data partition, and wherein said second format is selected from a group consisting of bypass-I, bypass-P, VLC non-data partition, RVLC non-data partition, and data partition.

13. The system of claim 8, wherein said memory is partitioned based upon a format selected from said first format and said second format.

14. The system of claim 8, wherein said memory comprises partitions corresponding to a set of said plurality of sections selected from a group consisting of said first set and said second set.

15. A method of processing video data, said method comprising:
accessing a selection of a format;
in response to selection of a first format, accessing data from a first set of a plurality of sections of a buffer, wherein each section of said plurality of sections is associated with a respective category of data;
in response to selection of a second format, accessing data from a second set of a plurality of sections of a buffer; and
transferring said data to a memory.

16. The method of claim 15 further comprising:
performing an adjustment on said data, wherein said adjustment is selected from a group consisting of a byte-aligning and a byte-stuffing.

17. The method of claim 15 further comprising:
accessing said data from an MPEG-4 Variable Length Coding (VLC) device; and
storing said data in said buffer.

18. The method of claim 15, wherein said plurality of sections of said buffer are selected from a group consisting of a first header section, a second header section, a data/texture section, a DC section, and a packet header section.

19. The method of claim 15, wherein said first format is selected from a group consisting of bypass-I, bypass-P, VLC non-data partition, RVLC non-data partition, and data partition, and wherein said second format is selected from a group consisting of bypass-I, bypass-P, VLC non-data partition, RVLC non-data partition, and data partition.

20. The method of claim 15 further comprising:
partitioning said memory based upon a format selected from said first format and said second format.

21. The method of claim 15 further comprising:
partitioning said memory to include partitions corresponding to a set of said plurality of sections selected from a group consisting of said first set and said second set.

* * * * *